Jan. 6, 1959  B. BENZON-PETERSEN  2,867,159
DEVICE FOR PRODUCING CONTAINERS SEALED WITH COVERS
Filed May 13, 1955  12 Sheets-Sheet 5

Boye Benzon-Petersen
INVENTOR

Pierce, Scheffler & Parker
Attorneys

Jan. 6, 1959　　　B. BENZON-PETERSEN　　　2,867,159
DEVICE FOR PRODUCING CONTAINERS SEALED WITH COVERS
Filed May 13, 1955　　　　　　　　　　　　　　12 Sheets-Sheet 10

Boye Benzon-Petersen
INVENTOR

Pierce, Scheffler & Parker
Attorneys

United States Patent Office 2,867,159
Patented Jan. 6, 1959

2,867,159

DEVICE FOR PRODUCING CONTAINERS SEALED WITH COVERS

Boye Benzon-Petersen, Lund, Sweden, assignor to Aktiebolaget Akerlund & Rausing, Lund, Sweden, a Swedish company Application May 13, 1955, Serial No. 508,224

Claims priority, application Sweden May 14, 1954

7 Claims. (Cl. 93—36)

The present invention concerns a method and a device for sealing containers, whereby the sealing is accomplished by the means of covers closing the ends of the containers and being pasted on the insides of the end-flaps.

The method, according to the invention, substantially comprises successively feeding open container blanks into U-shaped holders closing said holders on the open side, so that the container closest to the flaps will be surrounded by a rectangular frame, bending out the container flaps to contact the frame, providing a continuous band of cover material in such a way, that it covers both the front and rear flaps as well as a certain part of the side flaps, pressing the cover material and the flaps against the rectangular frame by means of a heated sealing device, while simultaneously pressing the container against said sealing device from the opposite direction, so that sealing pressure is also obtained at the corners of the container, the container blanks being so designed, as shown in my co-pending application Serial No. 384,160, filed October 5, 1953, which issued as Patent No. 2,795,364, that the down-cut for the flaps will end just before the score lines of the flaps are reached, so that, when the flaps are bent out, the container material in the corners between the flaps will be roughened, or, if the container material is impregnated with plastic or covered with plastic foil said material is extended for the enlargement of the pasting surface in the corners between the flaps cutting the cover band between the two adjacent flaps of two adjacent container blanks, and bending the flaps inwards.

The covers may consist of plastic foil or may be covered or impregnated with thermoplastic resin, wax, paraffin or other material, which may be pasted on through pressing, eventually while being heated. If the container material is impregnated or covered on the inside with such thermoplastic material, the cover band may eventually consist of a non-impregnated paper band.

The invention is also concerned with an apparatus for carrying out the above mentioned method. Said apparatus consists substantially of a storage chamber for the container blanks, a sealing machine and a mechanical feeding device for moving the container blanks from the storage chamber to the sealing machine, and is also suitably combined with a device for filling the containers and is substantially characterized in the sealing machine consisting of an endless conveyor supported in bearings on a machine frame, said conveyor being provided with U-shaped holders for the container blanks, guide rails and folding arms for folding the flaps of the container blanks, located in the U-formed holders to contact the plane surfaces of the holders, a ruler, arranged to cooperate with said holder, in such a manner that the holders and the ruler form a closed rectangular frame around the container blank, close to the flaps, a band of sealing material arranged in the machine frame to move synchronously with the motion of the container blanks over the flaps, when folded outwards, a pressing plate, arranged to press and seal the cover material against the container flaps, a cutting device, arranged to cut off the cover band at the rear edge of the rear flap reckoned in the direction of motion, after the sealing being accomplished, additional folding rulers and folding arms for folding inwards the flaps provided with covers, and a device for fastening the flaps when folded inwards. When using a cover band, that is impregnated with wax or paraffin or similar material, it is of importance to arrange a cooling plate, located immediately behind the heated sealing plate reckoned in the direction of motion, in order to hasten the solidifying and thereby also hastening the binding of the cover material with the container material.

The apparatus according to the invention can be considered to consist of the following main parts:

(a) The carton or storage chamber with feeding mechanism, (b) The sealing machine proper.

The invention will hereinafter be described more in detail with reference to the accompanying drawings.

Figure 1:
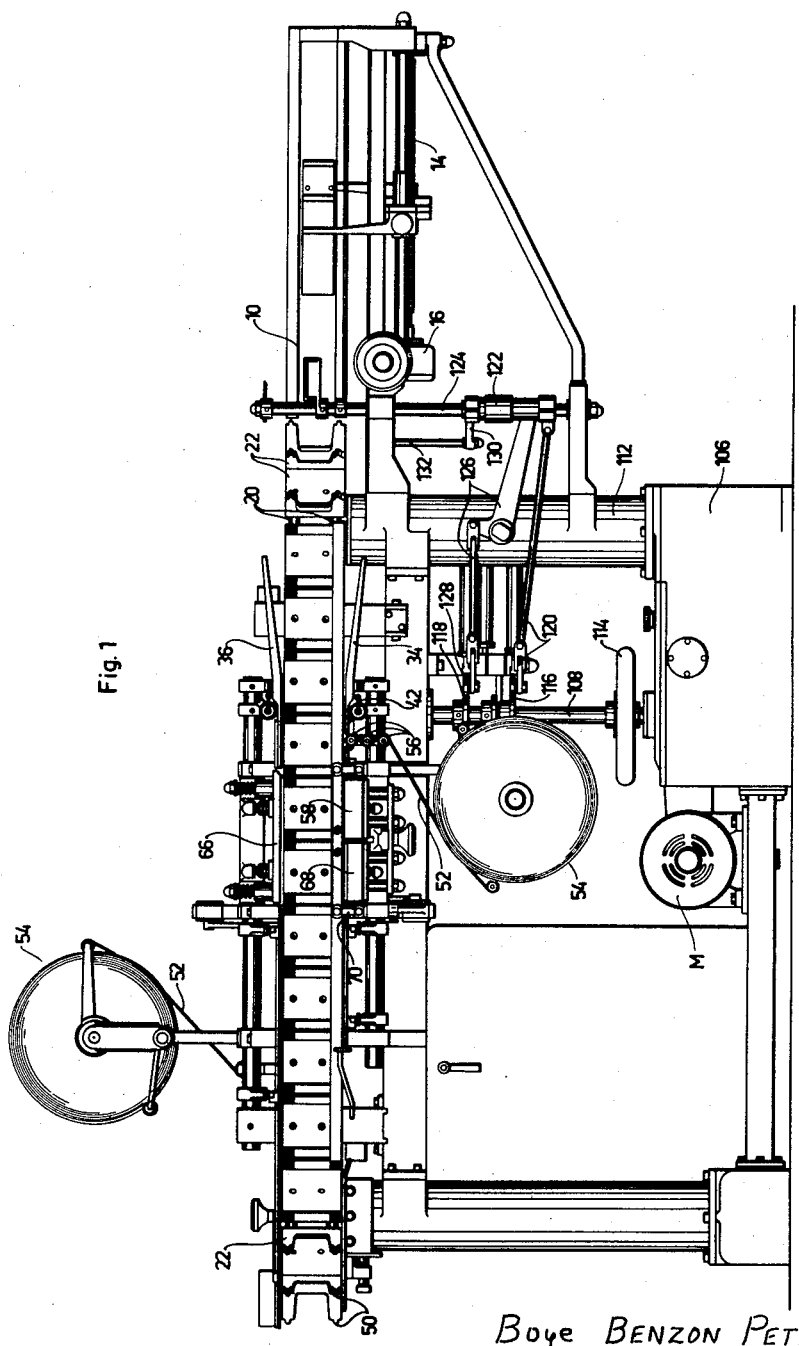
Fig. 1 is a side view of the complete assembly.

The carton magazine consists of a container or a frame 10 for flat container blanks 12 and a feed screw 14 located in the same, suitably driven by a separate motor 16 for feeding the container blanks against a contact arm 18, which will shut off the current to the motor 16 at a certain packing pressure on the container blanks 12, and again closes the current when this pressure is reduced, through a certain number of blanks 16 having been fed into the sealing machine.

The sealing machine consists of an endless conveyor in the shown embodiment a double link chain 20, carrying holders 22, having U-shaped profiles and having their openings 24 turned out, and dimensioned according to the blanks 12, which are to be sealed. The holders are suitably made exchangeable, in order to facilitate the changing over of the machine from one blank dimension to another.

The link chains 20 run around double sprockets 26, 28, of which the one sprocket 26 is driven from the motor M; while the other 28 is running free and suitably adjustable for regulation of the chain tension.

The endless conveyor has two linearly running parts 30 and 32, where along the first of these, part 30, devices are located for sealing the bottom of the blanks, while along the other part 32 devices are located for sealing the tops of the blanks.

Figure 7:
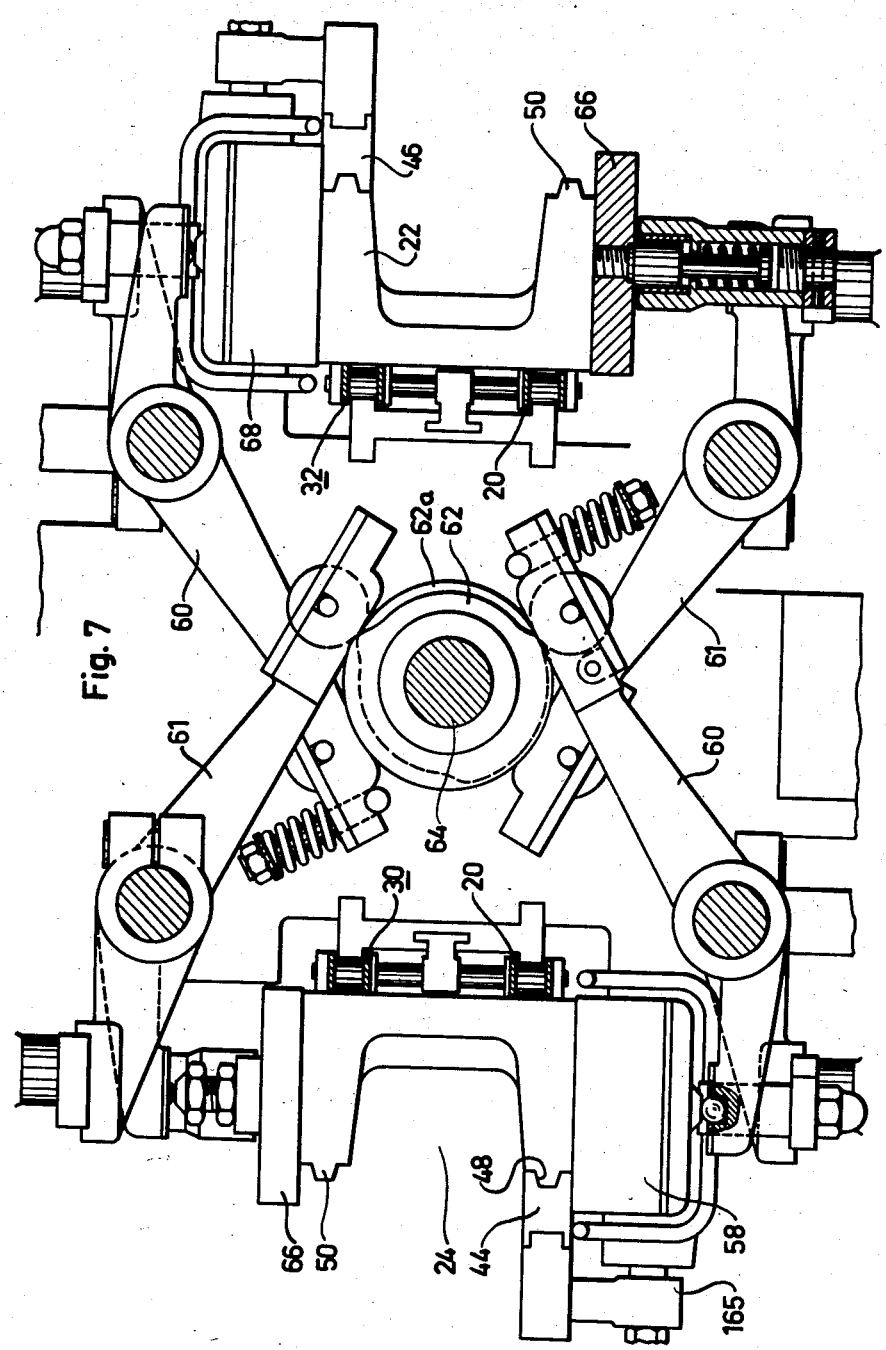
Fig. 7 is a sectional view illustrating the maneuvering mechanism for the sealing and counterpressure plates.

Before sealing, however, it is necessary, that the blank flaps at top and bottom be folded out. For this purpose, stationary folding rulers or bars 34, 36 are arranged for the side flaps 38 and 38a and for the rear end flap 40, and a movable folding arm 42 for the front end flap 40a. With these devices the bottom flaps are turned out to form contact with the bottom surface of the U-shaped holders 22, while the top flaps are bent to contact the top surface of the holders 22. In order to obtain a rigid support even for the outer flaps there are provided rulers 44, 46 (Figs. 1, 5, 6, 7), movable between two positions, said rulers in the one position closing a U-shaped holder to form a rectangular frame, and in the other position being free from the holders 22, so that these holders may move together with the link chains 20. The rulers 44 are equipped with grooves 48 (Figs. 5 and 7) fitting nibs or teeth 50 located on the holders 22, in order to facilitate the matching.

Figure 2:
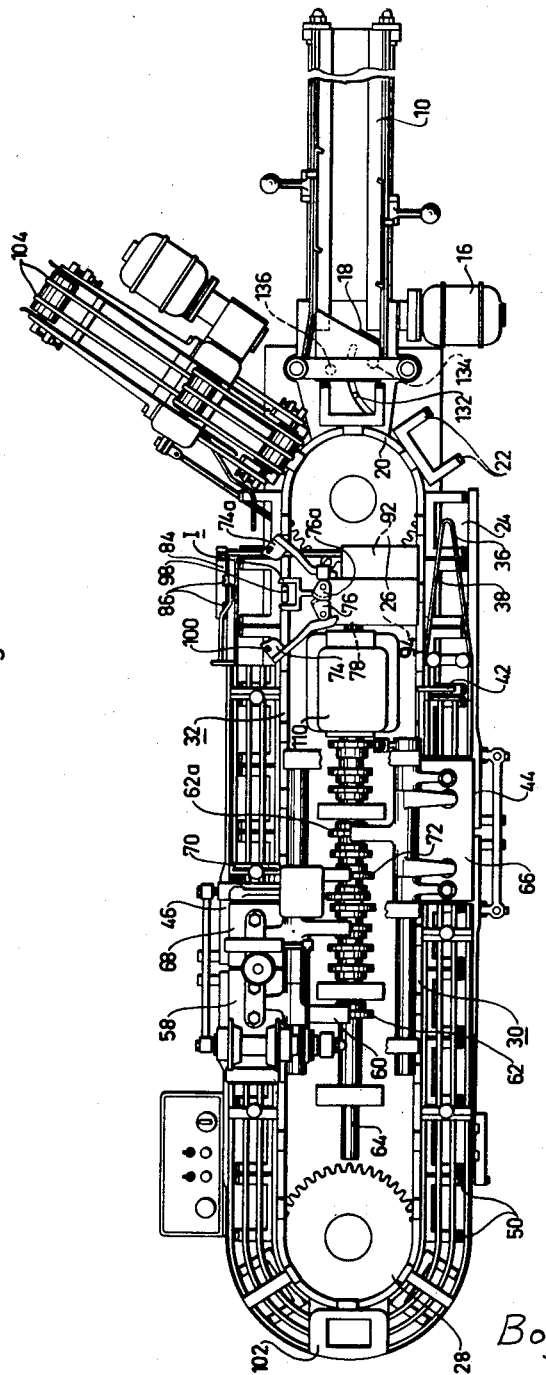
Fig. 2 is a top view of the assembly.

The sealing is accomplished by means of a cover paper band 52 (Figs. 1 and 6), which is pasted against the flaps, when folded out, so that the openings of the container blanks are covered. For each opening in the bottom and the top respectively, a roll of cover paper 54 (Fig. 1), is provided and also bending or guiding rolls 56 (Fig. 1), for the insertion of the cover paper band to form contact with the turned out flaps of the container blanks. Immediately behind the place where the paper band 52 is inserted to form contact with the container blank flaps, counted in the direction of motion of the hauling track 20, a rocking heating plate 58 (Figs. 1 and 7), is located, regulated through a spring loaded rocker arm 60 (Fig. 7) from a camshaft pulley 62 on a common camshaft 64 for the different movements in the sealing machine. The heating plate is suitably provided with electric resistance elements for heating to a desired sealing temperature. On the opposite side of the container blanks, being sealed, and directly opposite the heating plate 58, a counter pressure plate 66 (Figs. 1, 2, 7) is located, which in a similar manner is regulated by means of a rocker arm 61 (Fig. 7) from the same camshaft pulley as the heating plate, or from another camshaft pulley 62a (Fig. 7) located on the common camshaft 64. Behind the heating plate, considered in the direction of motion, there is preferably provided a cooling plate 68 (Figs. 1, 6, 7), which is regulated in a similar manner, so that the same may be pressed against the pasted-on cover band, in order to hasten the solidifying of the binding agent. The binding agents may in this case be impregnated in or painted on the cover paper band and/or the container blank flaps may be coated with or impregnated with a suitable binding agent which binds under heating.

Thus, when the cover paper band has been pasted on the container blank flaps, the cover paper band must be cut off between the rear flap on a preceding container blank and the forward flap on the closest following container blank. For this purpose a back and forth movable knife is fitted, suitably in the shape of an axe 70 (Figs. 1, 2, 6), which is also regulated from a camshaft pulley 72 (Fig. 2) on the common camshaft 64.

Figure 11:
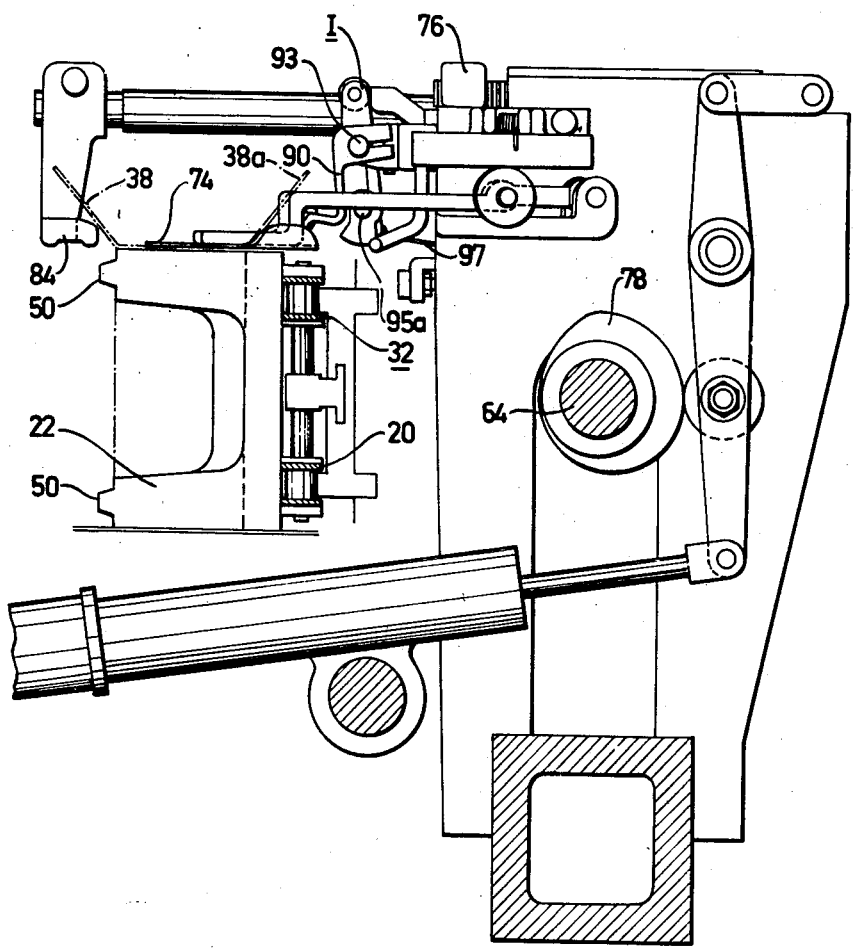
Figure 12:
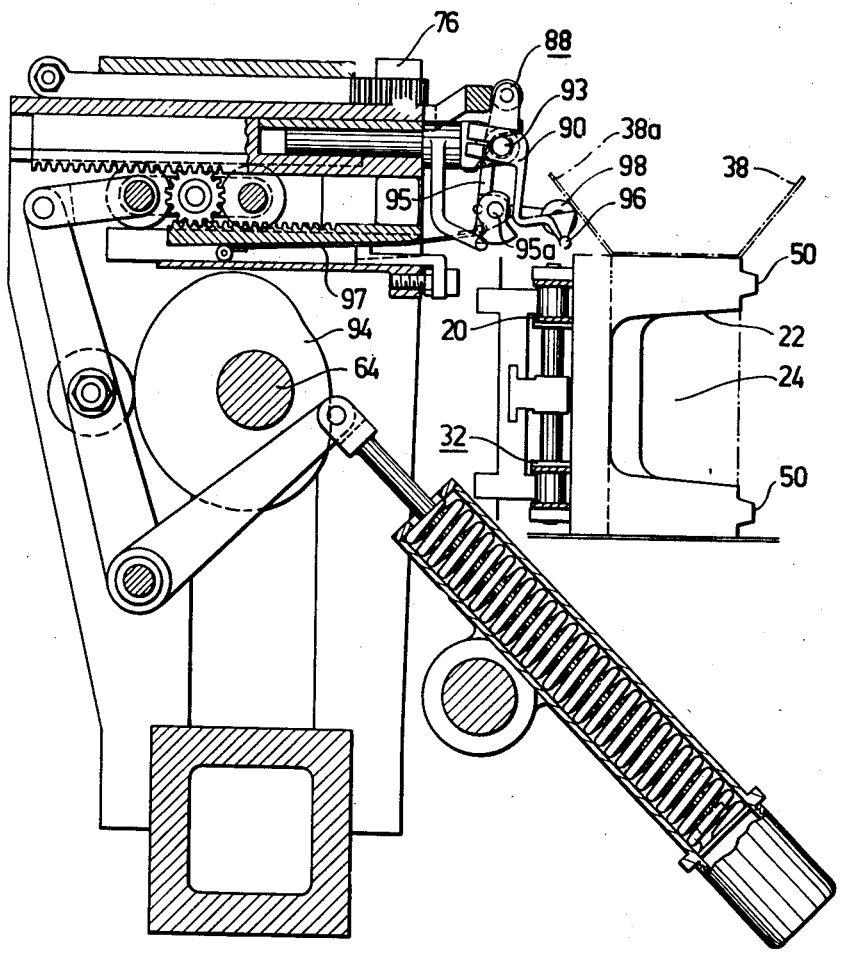

After the cover paper band has been cut between two adjacent containers, the bottom flaps should be turned in. For this purpose a finger 74 and 74a, respectively (Figs. 2, 8, 9), is fitted for each of the rear and the forward flap 40 and 40a respectively, which fingers are regulated by means of a link mechanism 76 and 76a respectively (Figs. 2, 9), from a common camshaft or each from its own camshaft pulley 78 (Fig. 11) on the common camshaft 64, in such a manner that the fingers describe a wave-formed motion. For the two side flaps, two stationary folding rulers and pasting roll or a mechanism for providing a pasting strip could be fitted, for the purpose of securing the flaps in the finished position.

Figure 8:
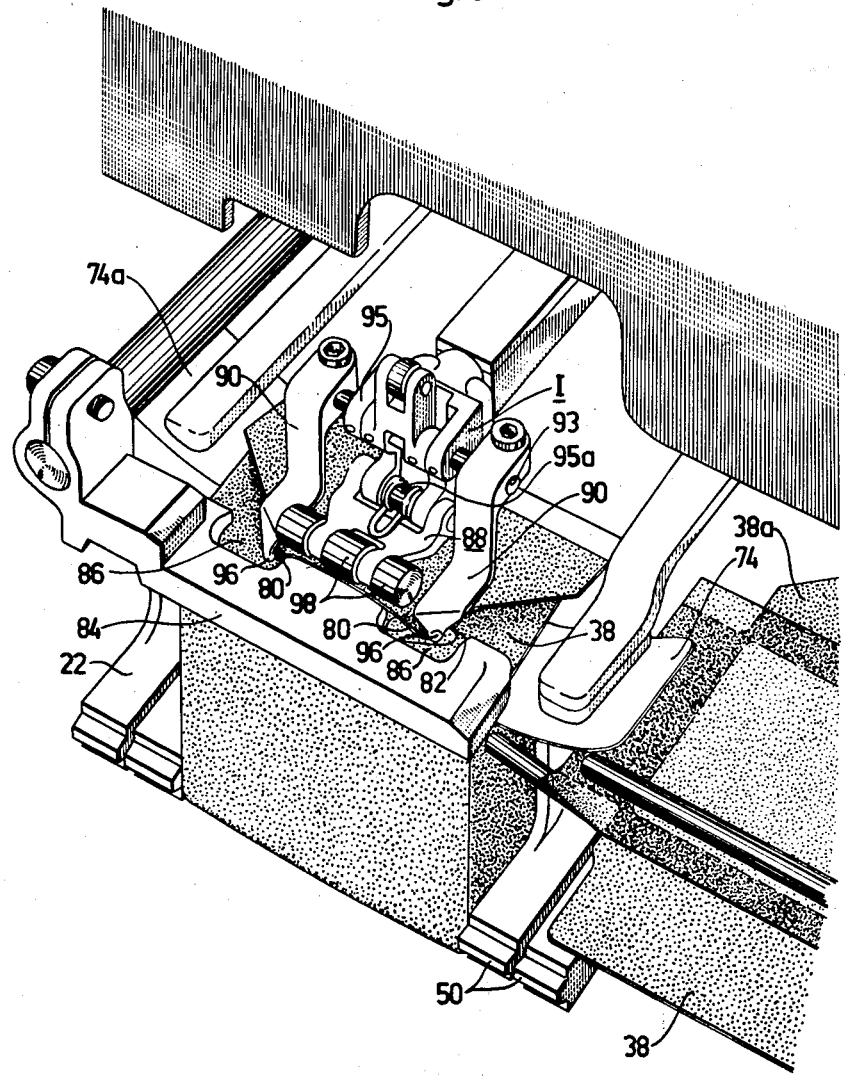
Figs. 8–12 are details illustrating the means for refolding and securing the flaps after the sealing, Fig. 8 being a perspective front view, Fig. 9 a top view illustrating the gear mechanism for maneuvering the folding spoons, and Figs. 10–12 sections illustrating the maneuvering mechanism.
Figure 9:
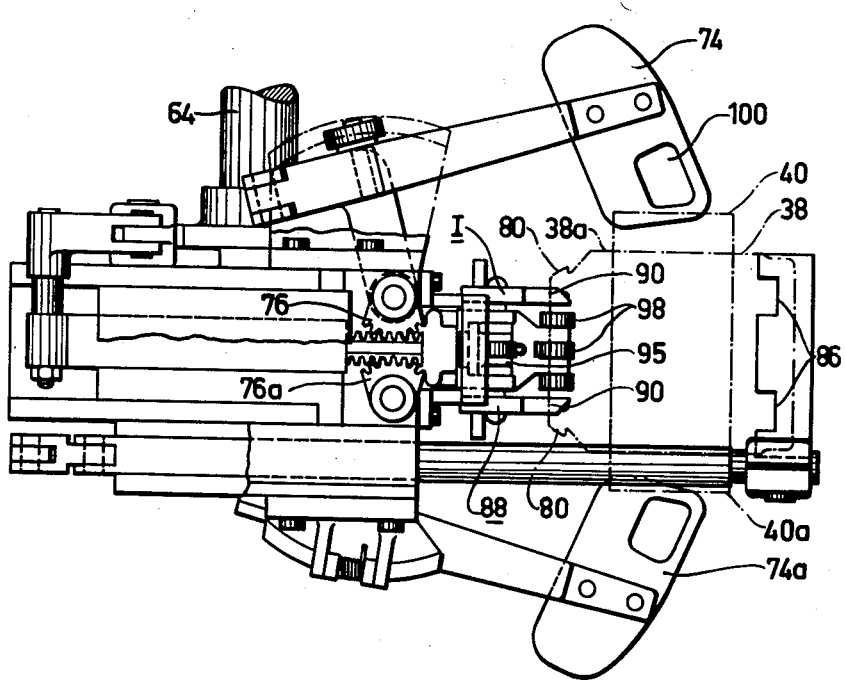
Figure 10:
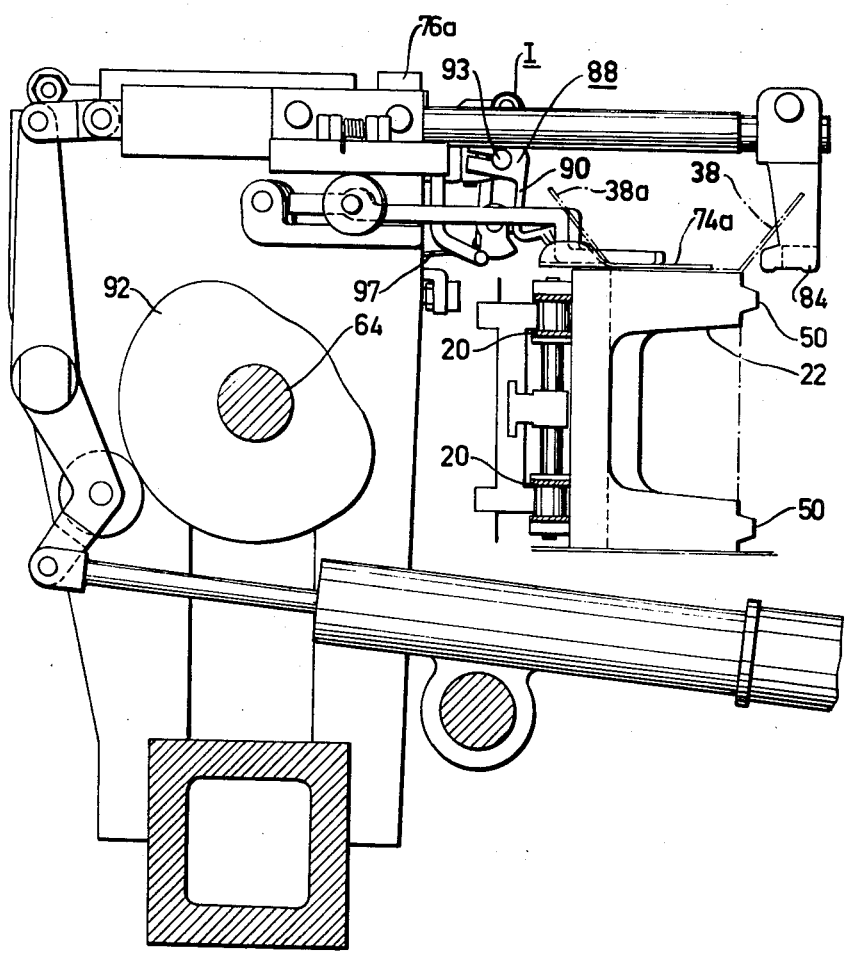

With flaps with double insert tongues 80 on the one (inside) flap 38a, intended to be inserted through slits 82 in the other (outer) side flap 38 (Figs. 8, 9), the machine is equipped with a special insertion mechanism I, the construction and functioning of which is especially illustrated in Figs. 2, 8, 9, 12. This mechanism contains a forth and back movable head 88, which carries rocking insert fingers 90, arranged to cooperate with a forth and back movable sliding ruler 84, provided with two notches 86. The ruler 84 as well as the head 88 obtain their forth and back motions from camshaft pulleys 92 (Fig. 10) and 94 (Fig. 10) respectively, located on the common camshaft 64. The fingers 90 can be rocked by an axle 93 and are provided with a crank 95, supporting an axle 95a. A drawband 97 is secured to the crank 95. Further, in the head 88 rollers 98 are supported in bearings for the cooperation with the ruler 84 (Figs. 8, 9). This device functions in the following manner:

At first the ruler 84 is pushed into the position as shown in Fig. 8, while folding the outer side flap 38, which is provided with slits 82. After that the head 88 is brought forward, whereby the outer ends 96 of the fingers 90 will be turned up under spring action, so that the inner side flap 38 is lifted, under continued motion of the head 88, is folded over the opening in the container. Under this motion the roller 98 will slide up on the ruler 84 between the notches 86, while the ends 96 of the insertion fingers will pass into these notches. In this position the draw band 97 stretches and locks the axle 95a, so that at continued motion of the head 88 the fingers 90 will swing downwards from the position shown in Fig. 12, while folding the tongues 80 against the slits 82. In this position the rule 84 is pulled back, whereby the roller 98 under spring action will press down the flap 38a, so that the tongues 80 will pass through the slits 82 and will straighten under the flap 38. The insertion head 88 as well as the fingers 74 will then return to their original positions. The fingers 74 are provided with holes 100 which are located under the slits 82 while the fitting in of the tongues 80 takes place.

After the bottoms of the containers have been closed, they should be filled, which may be done with a portioning device 102 (Fig. 2) known per se, which is suitably located at the place, where the conveyor chains turn. Along the returning pair of chains there are provided corresponding devices to the ones described above, for sealing and closing the opposite container ends, and finally a device for the feeding out of filled and finished containers, which device may suitably consist of conveyors 104 (Fig. 2) located adjacent to the top and bottom surfaces of the containers, and preferably made from textile material or rubber.

The machine is driven by the motor M through a gearing device 106 (Fig. 1), from which projects a vertical shaft 108 which continuously drives the camshaft 64, by means of a gear drive 110, and an axle for the driving wheel of the continuous conveyor 20, said axle extending through a hub in the frame. The last named axle projects from a planetary gearing device, to make possible the intermittent operation of the conveyor.

Figure 3:
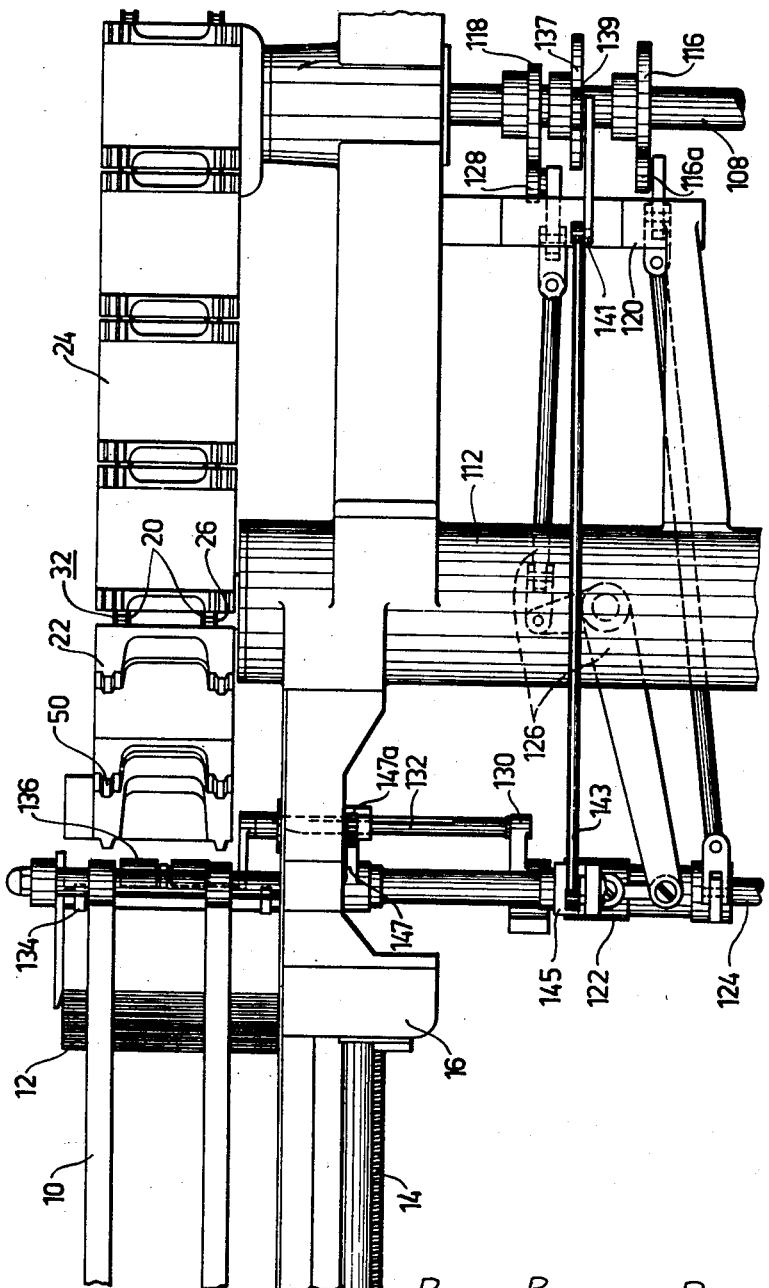
Figs. 3 and 4 are details of the carton magazine with feeding mechanism in side elevation and plane respectively.
Figure 4:
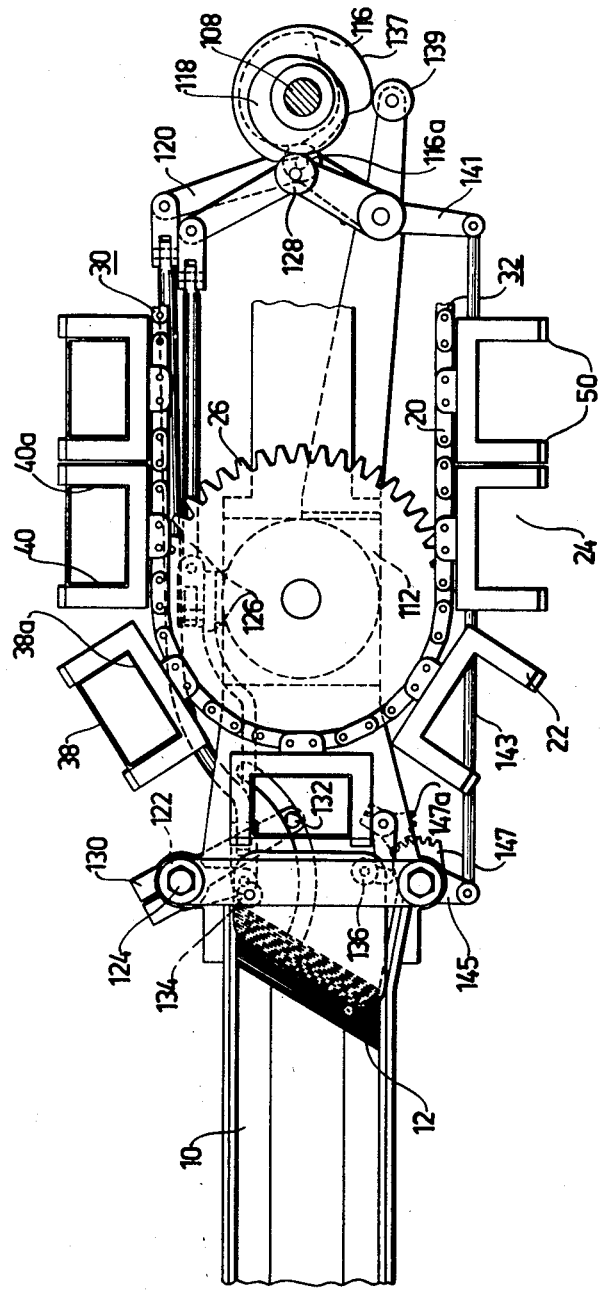

The axle 108 carries, on the one hand a hand wheel 114, with which the machine may be operated by hand, for instance while inserting the cover paper band, and on the other hand camshaft pulleys 116 and 118 (Figs. 1, 3, 4) for the regulation of the feeding device for feeding the container blanks from the storage chamber 10 into the U-shaped holders 22.

Against the camshaft pulley 116, a roller 116a runs under spring action, fastened to the one end of a crank and link mechanism 120 (Figs. 3, 4), the other end of which is supported in bearings on a sleeve 122, which can swing, be raised or lowered on a shaft 124. For the raising or lowering of the sleeve 122 there is provided a crank and link mechanism 126, carrying a roller 128, which is held under spring action against the camshaft pulley 118. The sleeve 122 also carries, by means of a crank arm 130, a feeding arm 132, which, actuated by the link mechanisms 120 and 126, performs the working cycle, which is required for feeding a container blank into a holder 22.

Between the storage chamber 10 and the link conveyor 20 with its holders 22, two bend rollers 134 and 136 (Figs. 2, 3, 4), are located, in order to facilitate the opening of the container blank from its flat-pressed condition, while being fed into a holder 22. One of these rollers is arranged to swing, in order to definitely press the container blank into the holder 22, through pressing against the container edge, which is diametrically opposite the one, against which the feeding arm 132 fits during the feeding motion.

A cam disk 137 is arranged on the shaft 108 so as to actuate the roller 139 on one end of the arm 141, the other end of which is movably connected to a bar 143, which is arranged so as to turn a sleeve 145, which actuates the roller 136 via the cog wheel segments 147 and 147a.

In order to obtain sufficient roughening of the container material in the corners between the flaps, necessary for obtaining full tightness, it is essential that the overlapping joint, which is obtained at the production of the containers, extends over one of the flaps. Through this a double thickness of material will be obtained at this overlapping joint, while the container flaps in general have only single thickness of material. It has been observed at tests, that a leakage easily occurs at the change from double to single container material at the overlapping joint. In order to stop this leakage, the sealing plate may be provided with two nibs or ridges, which during the sealing process will be pressed into the container material, at right angles to the over-lapping joint. It has been proven, that two such impressions at a mutual distance apart of a few millimeters is amply sufficient to secure tightness.

Figure 5:
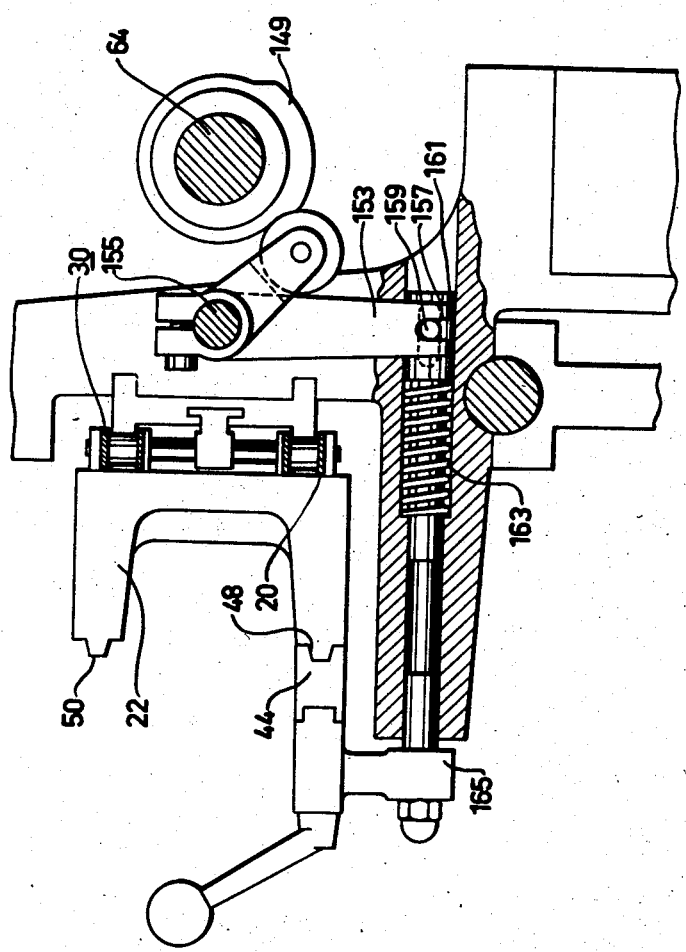
Fig. 5 illustrates the mechanism for completing the holder to a rectangular frame against which the flaps are pressed during the sealing operation.
Figure 6:
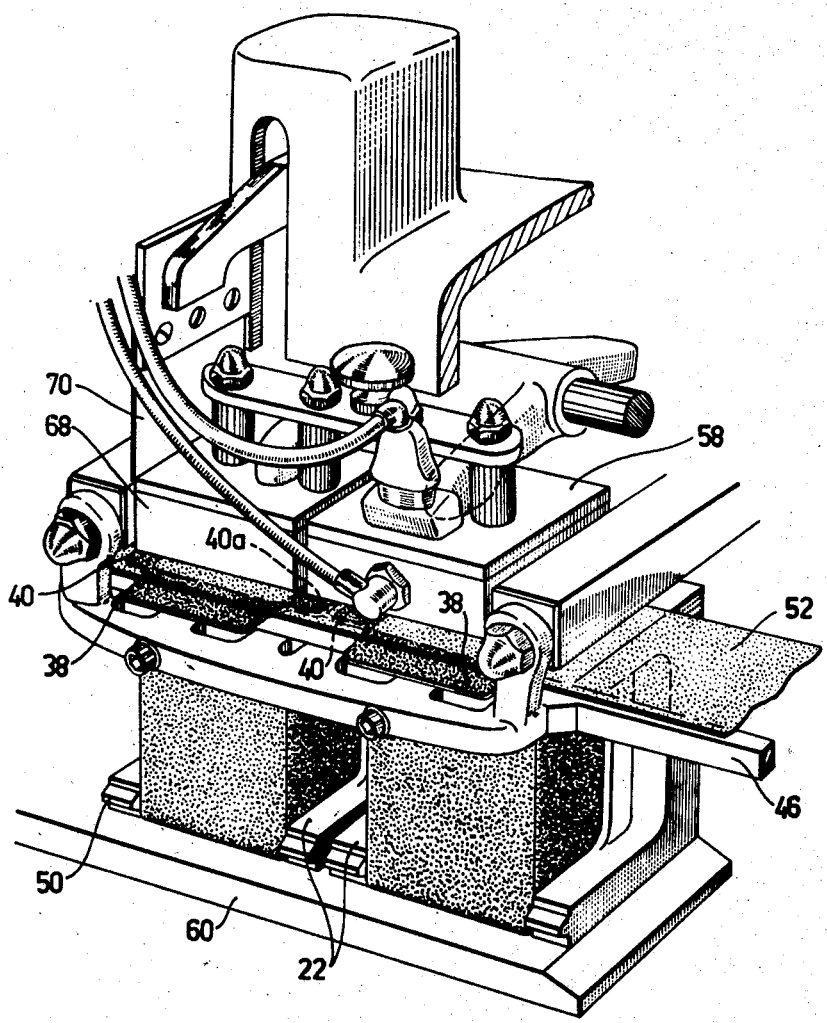
Fig. 6 is a perspective view of the sealing device proper.

A cam disk 149 is provided on the common camshaft 64 (Fig. 5). A lever arm 153 is carried by a shaft 155 and carries a roller 151 which is arranged to cooperate with the cam disk 149. The other end of the lever arm 153 is provided with a recess 157, arranged to engage a pin 159, provided on a bar 161, which is slidably arranged in the frame of the apparatus, against the action of a spring 163. The bar 161 is connected to the ruler 44 by means of a piece 165. When the roller 151 engages the top of the cam disk 149, the lever arm 153 presses the bar 161 towards the left in Fig. 5, the ruler 44 consequently being brought out of engagement with the holder 22.

All the working parts of the machine are suitably kept in non-working positions by means of springs, and are mechanically brought into working positions by cam action.

The operation of the machine should be fully made clear by the above description.

What I claim is:

1. In an automatic machine of the kind recited for producing rectangular packages from collapsed container blanks having end flaps, means for successively transforming collapsed container blanks of a blank supply into rectangular upright tube form, while horizontally supplying them into individual U-shaped holders having substantially plane horizontal U-formed end surfaces, the effective inner cross-section and the effective height of said U-formed holders substantially corresponding to the outer cross-section and the height, respectively, of the rectangular container blank side wall; endless conveyor means for carrying said U-shaped holders edgewise along a horizontal re-entrant path through the machine; means for successively outwardly folding said end flaps of said upright tube-formed container blanks so as to lie against said U-formed end surfaces of said holders; means for successively covering one end opening of said upright tube-formed container blanks and at least part of the corresponding outwardly folded end flaps with an individual flexible membrane and sealing said membrane to the respective end opening edges and end flaps to form a re-entrant leak-proof sealing; means for severing from a flexible continuous strip successive strip lengths to form said sealing membranes; means for successively inwardly folding and mutually securing the end flaps of said sealed-off container blank ends to form bottom and top end closures, respectively, said folding, sealing, severing, and flap closing means each being cooperative with at least one of the two holder end surfaces of at least one of two successive U-shaped holders to secure functioning of the respective means.

2. A machine as recited in claim 1, in which said folding means comprises folding members, both fixed and movable, said folding members being adapted in co-operation with the inner U-shaped boundary edge of the corresponding holder end surface to fold the respective container blank end flaps outwardly into engagement with said holder end surface.

3. A machine as recited in claim 1, in which said sealing means comprises a member adapted to close one holder end surface to form a substantially plane frame-shaped surface, a counter pressure plate adapted in co-operation with the opposite holder end surface to determine the height position of the container blank in the holder, and a plane pressure plate adapted in co-operation with said frame-shaped surface to apply a sufficient pressure to said membrane to seal it to the opening edges and the end flaps of the corresponding container blank end.

4. A machine as recited in claim 1, in which said severing means comprises a cutting edge co-operating with the corresponding end surfaces of two successive holders to sever a flexible continuous strip supported by said two holder end surfaces.

5. A machine as recited in claim 1, in which said end flap closing means comprises means co-operating with one holder end surface to determine the container blank height position in the holder.

6. A machine as defined in claim 1 and which further includes apparatus for feeding container blanks into said U-shaped holders of said machine, said feeding apparatus comprising a storage chamber for a pile of flat pressed container blanks and a feeding arm, said feeding arm being arranged to swing and to be raised and lowered such that when said arm is in its lowered position it may be swung against the lower rear flap of the outermost flat pressed container blank in the pile, and under the following lifting motion be inserted in the container blank at the front score line of a container edge, and in this latter position swing with the container blank into one of said U-shaped holders, after which said feeding arm returns to its original position.

7. A machine as defined in claim 6 having a container blank feeding apparatus wherein the movement of said feeding arm is established by two camshaft pulleys on a drive shaft of said machine, one of said pulleys controlling the swinging motion of said arm and the other of said pulleys controlling the raising and lowering of said arm.

References Cited in the file of this patent

UNITED STATES PATENTS

| | | |
|---|---|---|
| 1,489,134 | Ladd | Apr. 1, 1924 |
| 2,615,377 | Farrell et al. | Oct. 28, 1952 |